US011927309B2

(12) United States Patent
Choi et al.

(10) Patent No.: US 11,927,309 B2
(45) Date of Patent: Mar. 12, 2024

(54) AUTOMATIC ALIGNMENT METHOD OF HIGH-PRESSURE GAS CONTAINER

(71) Applicant: AMT CO., LTD., Asan-si (KR)

(72) Inventors: Won Ho Choi, Cheonan-si (KR); Chan Woo Kim, Cheonan-si (KR)

(73) Assignee: AMT CO., LTD., Asan-si (KR)

( * ) Notice: Subject to any disclaimer, the term of this patent is extended or adjusted under 35 U.S.C. 154(b) by 953 days.

(21) Appl. No.: 16/769,405

(22) PCT Filed: Dec. 10, 2018

(86) PCT No.: PCT/KR2018/015589
§ 371 (c)(1),
(2) Date: Jun. 3, 2020

(87) PCT Pub. No.: WO2019/117560
PCT Pub. Date: Jun. 20, 2019

(65) Prior Publication Data

US 2021/0190268 A1 Jun. 24, 2021

(30) Foreign Application Priority Data

Dec. 13, 2017 (KR) ........................ 10-2017-0170932
Nov. 29, 2018 (KR) ........................ 10-2018-0151035

(51) Int. Cl.
*F17C 13/04* (2006.01)
*B66F 7/10* (2006.01)
(Continued)

(52) U.S. Cl.
CPC .............. *F17C 13/045* (2013.01); *B66F 7/10* (2013.01); *B66F 7/28* (2013.01); *F17C 13/084* (2013.01);
(Continued)

(58) Field of Classification Search
CPC .. B66F 7/10; B66F 7/28; F17C 13/045; F17C 2205/0153
See application file for complete search history.

(56) References Cited

U.S. PATENT DOCUMENTS 11,320,094 B2 * 5/2022 Choi ........................ F17C 13/04
11,619,355 B2 * 4/2023 Choi ...................... F17C 13/084
901/46

FOREIGN PATENT DOCUMENTS

JP H05-172300 A 7/1993
JP H07-091598 A 4/1995
(Continued)

OTHER PUBLICATIONS

EP0059135A1 and machine translation (Year: 2023).*
International Search Report for PCT/KR2018/015589 dated Mar. 25, 2019 from Korean Intellectual Property Office.

*Primary Examiner* — Timothy P. Kelly
(74) *Attorney, Agent, or Firm* — Paratus Law Group, PLLC

(57) ABSTRACT

Disclosed is an automatic alignment method of a high-pressure gas container in which a high-pressure gas container is loaded on a lift of a cabinet so as to supply a gas from a fabrication (FAB) process facility of a semiconductor to a wafer production line, and then, the high-pressure gas container loaded on the lift is raised, and an end cap of the high-pressure gas container and the center of a connector holder of a gas pipe are automatically aligned.

8 Claims, 10 Drawing Sheets

(51) Int. Cl.
*B66F 7/28* (2006.01)
*F17C 13/08* (2006.01)

(52) U.S. Cl.
CPC .. *F17C 2205/0153* (2013.01); *F17C 2250/03* (2013.01); *F17C 2250/0478* (2013.01); *F17C 2270/0518* (2013.01)

(56) References Cited

FOREIGN PATENT DOCUMENTS

| | | | |
|---|---|---|---|
| JP | H07-190298 | A | 7/1995 |
| JP | H08-219396 | A | 8/1996 |
| KR | 10-0242982 | B1 | 2/2000 |
| KR | 10-0649112 | B1 | 11/2006 |
| KR | 10-0985575 | B1 | 10/2010 |
| KR | 10-1000996 | B1 | 12/2010 |

* cited by examiner

AUTOMATIC ALIGNMENT METHOD OF HIGH-PRESSURE GAS CONTAINER

CROSS-REFERENCE TO PRIOR APPLICATIONS

This application is a National Stage Patent Application of PCT International Patent Application No. PCT/KR2018/015589 (filed on Dec. 10, 2018) under 35 U.S.C. § 371, which claims priority to Korean Patent Application Nos. 10-2017-0170932 (filed on Dec. 13, 2017) and 10-2018-0151035 (filed on Nov. 29, 2018), which are all hereby incorporated by reference in their entirety.

BACKGROUND

The present invention relates to an automatic alignment method of a high-pressure gas container, in which a high-pressure gas container is loaded on the lift of a cabinet so as to supply a gas from a semiconductor fabrication (FAB) process facility to a wafer production line and then the high-pressure gas container loaded on the lift is raised, and the end cap of the high-pressure gas container and the center of the connector holder of a gas pipe are automatically aligned.

In general, various kinds of gas are supplied and used in a manufacturing process for manufacturing a semiconductor, and in the case where the gas is sucked into the human body or exposed to the atmosphere, the gas mostly causes great damage such as safety accidents and environmental contamination and thus careful attention is required.

For example, as the type of gas used in the ion implantation process, there is fluent gas such as Arsine (AsH3), Phosphine (PH3), or Boron Fluoride (BF3), and the gas must be carefully managed so that the gas does not leak during the supply to the production line because the gas is highly toxic and results in fatal consequences when a worker inhales the same in the respiratory system.

The gas used in the semiconductor manufacturing process is very important in its management, wherein the gas is supplied to a production line through a gas supply line in a state, in which the gas is charged with high-pressure in a gas container (hereinafter, referred to as a "high-pressure gas container") and the gas container is installed in a cabinet, and if the gas is exhausted by about 90%, a worker continues to supply gas by replacing the high-pressure gas container with a new high-pressure gas container so that the foreign substances remaining inside the high-pressure gas container are not supplied to the wafer processing process.

FIG. 1 is a perspective view schematically showing a prior art gas supply device of semiconductor equipment, in which a cabinet 1 is positioned at a predetermined position outside an FAB 7 so as to install a plurality of high-pressure gas containers (not illustrated) respectively filled with process gas such as SiH4, PH3, NF3, and CF4, which are required by various equipment 8 in the FAB helmet 7, and a duct 4 is installed at one side of the cabinet 1 so as to guide gas supply lines 3 connected to the high-pressure gas containers, respectively.

In order to supply the process gas introduced along the gas supply lines 3, regulator boxes 5 are installed at the other side of the duct 4 as many as the number corresponding to the number of the high-pressure gas containers, and supply pipes 9 are connected to the upper portion of each of the regulator boxes 5, wherein the number of the supply pipes 9 is equal to the number of the equipment 8 so that the supply pipes 9 can be connected correspondingly to each of the equipment 8 in the FAB 7.

Therefore, if the process gas is supplied from each of the high-pressure gas containers secured in the cabinet 1, each process gas is introduced into each of the regulator boxes 5 along the gas supply lines 3 passing through the inside of the duct 4.

Thereafter, each process gas introduced into each of the regulator boxes 5 is purified through a filter (not illustrated) and then supplied flowing through each of the supply pipes 9, which are branched to the number corresponding to the equipment 8 in the FAB 7 and connected thereto, so that wafers can be processed.

As described above, if the gas is exhausted while being supplied through the gas supply lines 3 and the replacement time of the high-pressure gas container is detected by a control unit (not illustrated), a worker closes the valve of the used high-pressure gas container and separates the used high-pressure gas container from the external gas line.

Thereafter, the worker unloads the high-pressure gas container, which has been separated from the gas line, from the cabinet 1, replaces it with a new high-pressure gas container, connects the high-pressure gas container back to the external gas line, and opens the valve handle that closes the gas injection nozzle thereof, thereby completing the replacement of the high-pressure gas container.

PRIOR ART DOCUMENTS

[Patent Document 0001] Korean Reg. Patent Publication No. 10-0242982 (Reg. on 15 Nov. 1998)

[Patent Document 0002] Korean Reg. Patent Publication No. 10-0649112 (Reg. on 16 Nov. 2006)

[Patent Document 0003] Korean Reg. Patent Publication No. 10-0985575 (Reg. on 29 Sep. 2010)

SUMMARY

However, in the conventional high-pressure gas container replacement, since a worker has to load a new high-pressure gas container into the cabinet and align the gas injection nozzle of the high-pressure gas container with the connector holder of the gas pipe while moving and rotating the high-pressure gas container that is heavy in place, it was impossible to carry out rapid replacement of high-pressure gas containers. In addition, if the connector holder is forcibly coupled to the gas injection nozzle in a state where the gas injection nozzle of the high-pressure gas container is not exactly matched with the connector holder of the gas pipe, there was a fatal defect in which the thread was broken and the toxic gas leaked.

In addition, since a worker manually replaces the high-pressure gas container from the cabinet, a human error is generated according to the skill of the worker, and when the gas leaks from the high-pressure gas container inadvertently due to carelessness during the replacement work, there was a fatal defect in which the gas exploded or the worker was poisoned by the leaked gas.

The present invention has been derived to solve these problems in the prior art and the purpose of the present invention is to realize automation in replacement of a high-pressure gas container by installing a lift in the cabinet so as to lift or lower therein and matching the center of the end cap of a valve coupled to a high-pressure gas container with the center of a connector holder connected to a gas pipe, while automatically raising, lowering, and rotating the high-pressure gas container loaded on the lift.

Another purpose of the present invention is to precisely match the center of the end cap of a high-pressure gas container with the center of the connector holder connected to a gas pipe all the time, even though the process and assembly tolerance is generated on a valve screw-coupled to the upper end of a high-pressure gas container, by completing the alignment of centers θ and centers Z for aligning the center of the end cap with the center of the connector holder connected to the gas pipe and then carrying out the alignment of the centers θ one more time so that the center of the end cap of the high-pressure gas container precisely matches the center of the connector holder connected to the gas pipe all the time.

In order to achieve the purposes, according to one aspect of the present invention, there is provided an automatic alignment method of a high-pressure gas container, characterized in that after a high-pressure gas container is placed on a lift and a lift is raised so that the horizontal center of an end cap of a valve installed at the upper portion of the high-pressure gas container coincides with the horizontal center of a connector holder, the center of the end cap is aligned with the center of the connector holder while the high-pressure gas container is rotated, and then the lift is raised or lowered, and finally, the center of the end cap is aligned with the center of the connector holder.

According to another aspect of the present invention, there is provided an automatic alignment method of a high-pressure gas container, comprising in sequence the steps of: loading a high-pressure gas container on a lift and raising the lift until a first sensor detects an upper end of a valve handle installed at the upper portion of the high-pressure gas container; re-driving the lift so as to re-raise the high-pressure gas container by a value set in a control unit (distance to the center of an end cap from the upper end of the valve handle) and then stopping the operation of the lift; rotating the high-pressure gas container and, when a second sensor senses a start point A of the end cap, notifying the control unit; continuously rotating the high-pressure gas container and, when the second sensor senses an end point B of the end cap, notifying the control unit simultaneously with stopping the rotation of the high-pressure gas container, and rotating the high-pressure gas container in the opposite direction according to the center θ of the end cap, which is calculated by the control unit, so as to align the center θ of the end cap with the center of the second sensor; raising the lift and, when the second sensor senses the top dead center C of the end cap, notifying the control unit and stopping the raising of the lift; and lowering the lift and, when the second sensor senses the bottom dead center D of the end cap, notifying the control unit simultaneously with stopping the lowering of the lift, and raising the lift according to the center Z of the end cap, which is calculated by the control unit, so as to align the center Z of the end cap with the center of the second sensor.

According to the present invention, if a high-pressure gas container is simply placed on the lift that is installed in the cabinet so as to be raised or lowered, the center θ and the center Z of the end cap screw-coupled to the gas injection nozzle of the valve can be automatically matched with the center θ and the center Z of the connector holder while raising, lowering and rotating the high-pressure gas container. Therefore, unlike the conventional manual replacement of high-pressure gas containers, it is possible to automatically replace high-pressure gas containers and, accordingly, it is possible to prevent human errors caused by workers in advance and to realize automation in the replacement of high-pressure gas containers.

DETAILED DESCRIPTION

Figure 1:
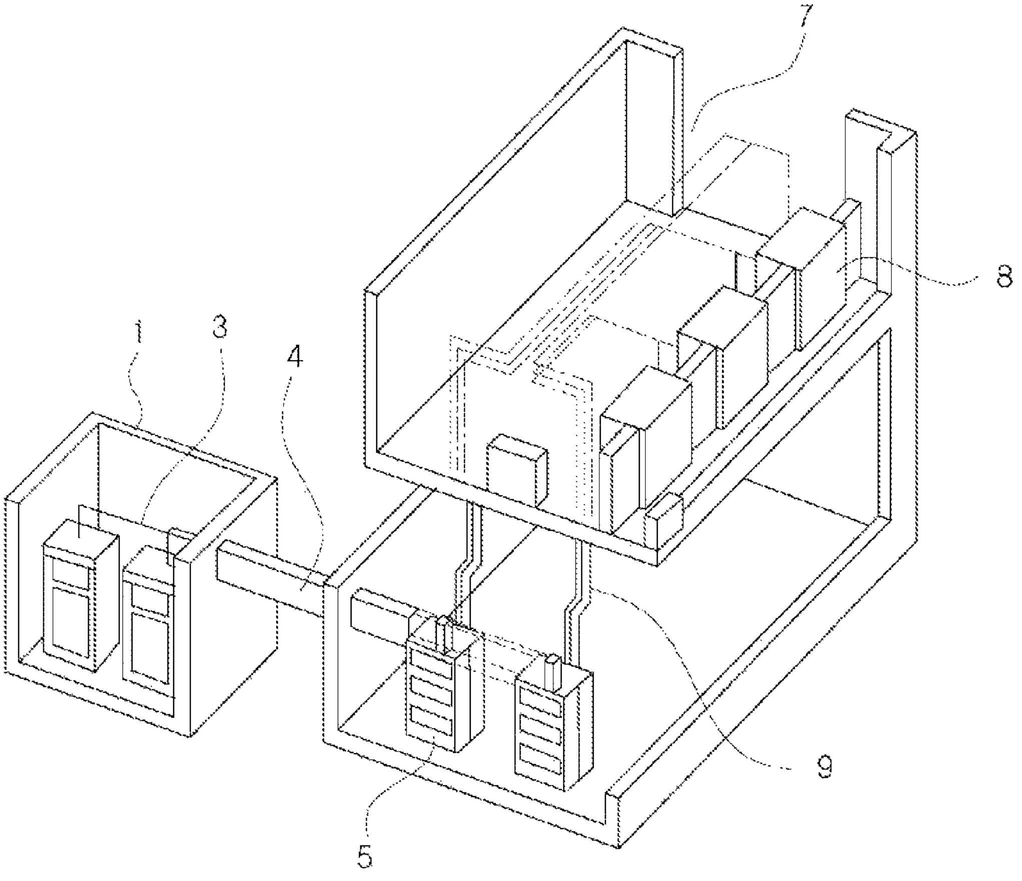
FIG. 1 is a perspective view schematically showing a prior art gas supply device of semiconductor equipment.

Hereinafter, preferred embodiments of the present invention will be described in detail with reference to the accompanying drawings so that those skilled in the art to which the present invention belongs can easily practice. The present invention may be embodied in many different forms and should not be construed as limited to the embodiments set forth herein. It is to be noted that the drawings are schematic and not drawn to scale. The relative dimensions and proportions of the parts in the figures are shown to be exaggerated or reduced in size for clarity and convenience in the drawings and any dimensions are merely illustrative and not limiting. In addition, like structures, elements, or components appearing in two or more figures are used to indicate like features.

Figure 2:
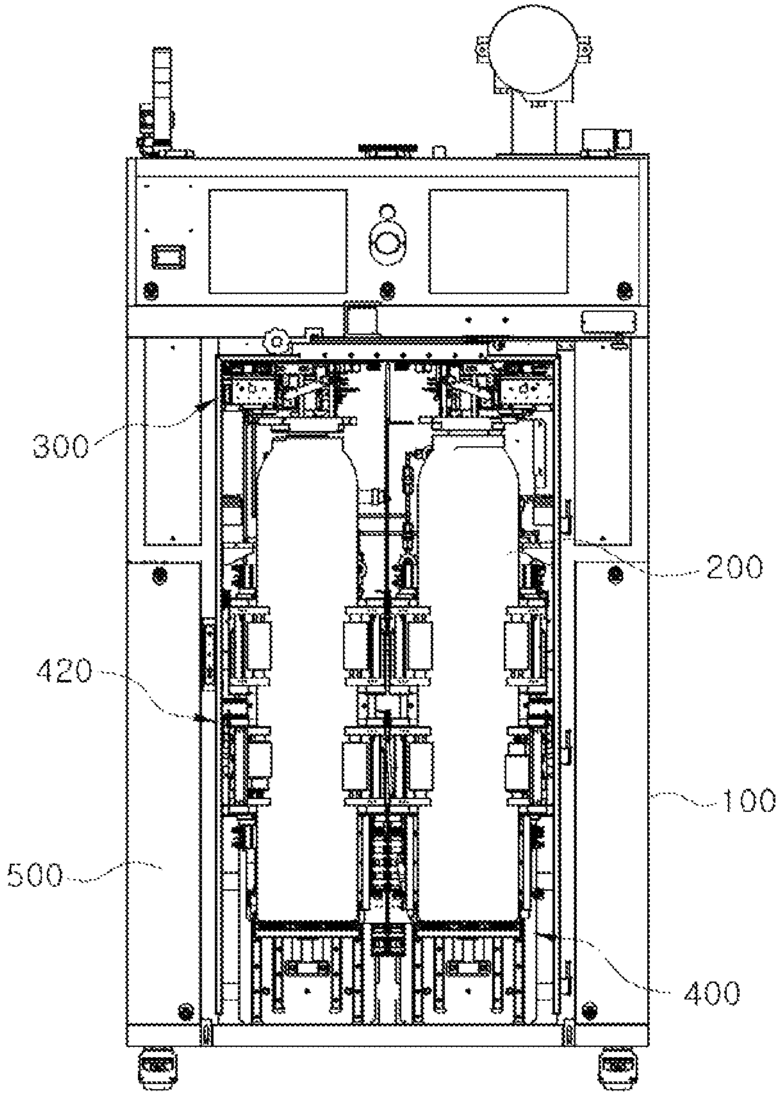
FIG. 2 is a front view of a cabinet for explaining the present invention.
Figure 3:
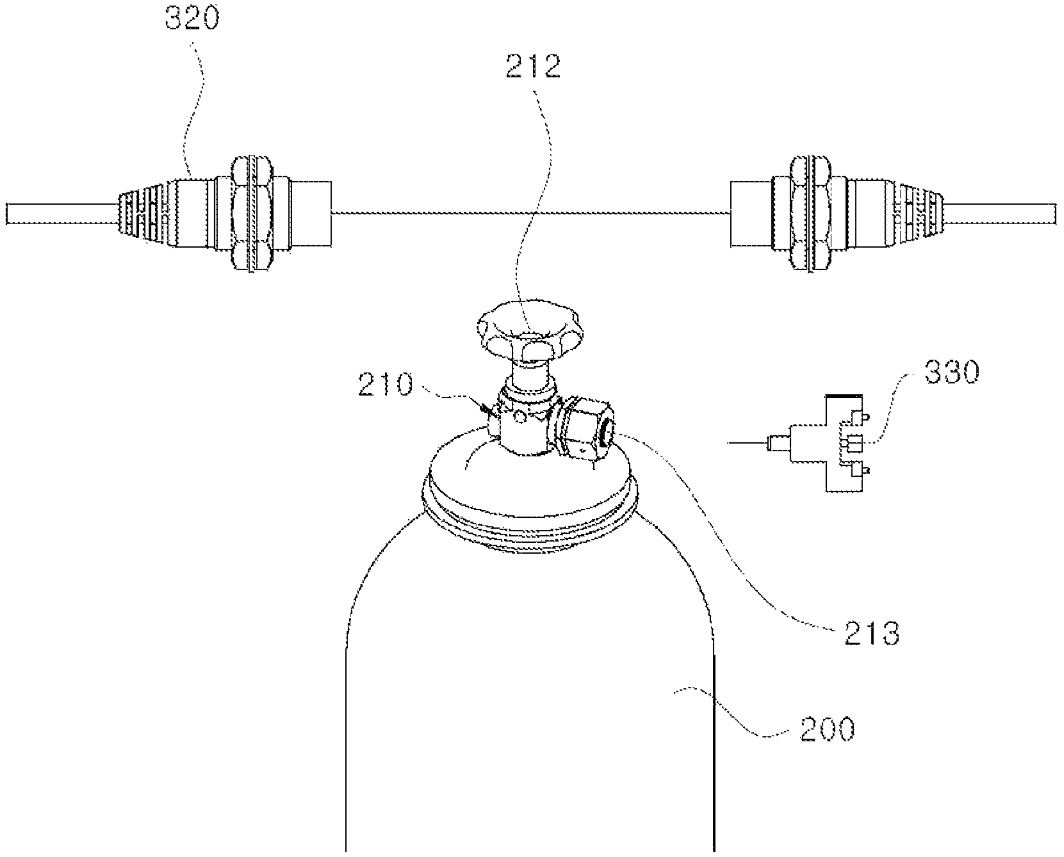
FIG. 3 is a perspective view showing the first and second sensors of the present invention.
Figure 4:
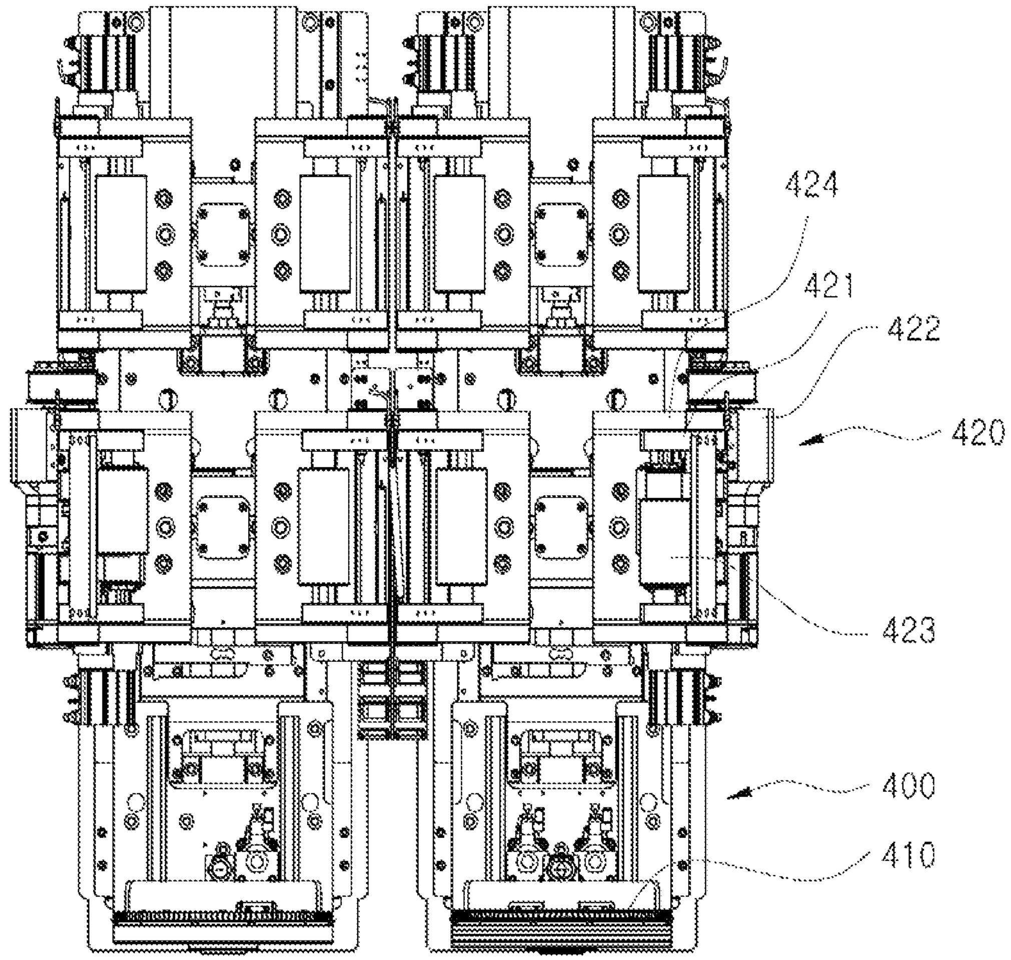
FIG. 4 is a front view showing the lift and clamp of the present invention.

FIG. 2 is a front view of a cabinet for explaining the present invention, FIG. 3 is a perspective view showing a state, in which the first and second sensors of the present invention are installed, and FIG. 4 is a front view showing the lift and clamp of the present invention. Referring to FIG. 2 to FIG. 4, the present invention includes a connection unit 300 installed on the upper portion of a cabinet 100 inside the cabinet 100 so as to automatically connect or release the gas injection nozzle 211 of a high-pressure gas container 200 to or from a connector holder 310, a lift 400 having a die 410 on which the high-pressure gas container 200 is mounted and raising or lowering the high-pressure gas container 200, a clamp 420 provided on the lift 400 so as to clamp and rotate the high-pressure gas container 200, and a control unit 500 for controlling the above constituent elements.

The connection unit 300 is provided with a first sensor 320 that detects the upper end of the valve handle 212 of the high-pressure gas container 200 raised by the lift 400, and a second sensor 330 is installed at the lower portion of the first sensor 320 so as to detect the center θ and the center Z of an end cap 213 according to the lifting, lowering and rotating of the high-pressure gas container 200.

Herein, the second sensor 330 is installed at a position corresponding to the center θ and the center Z of the connector holder 310.

Figure 5:
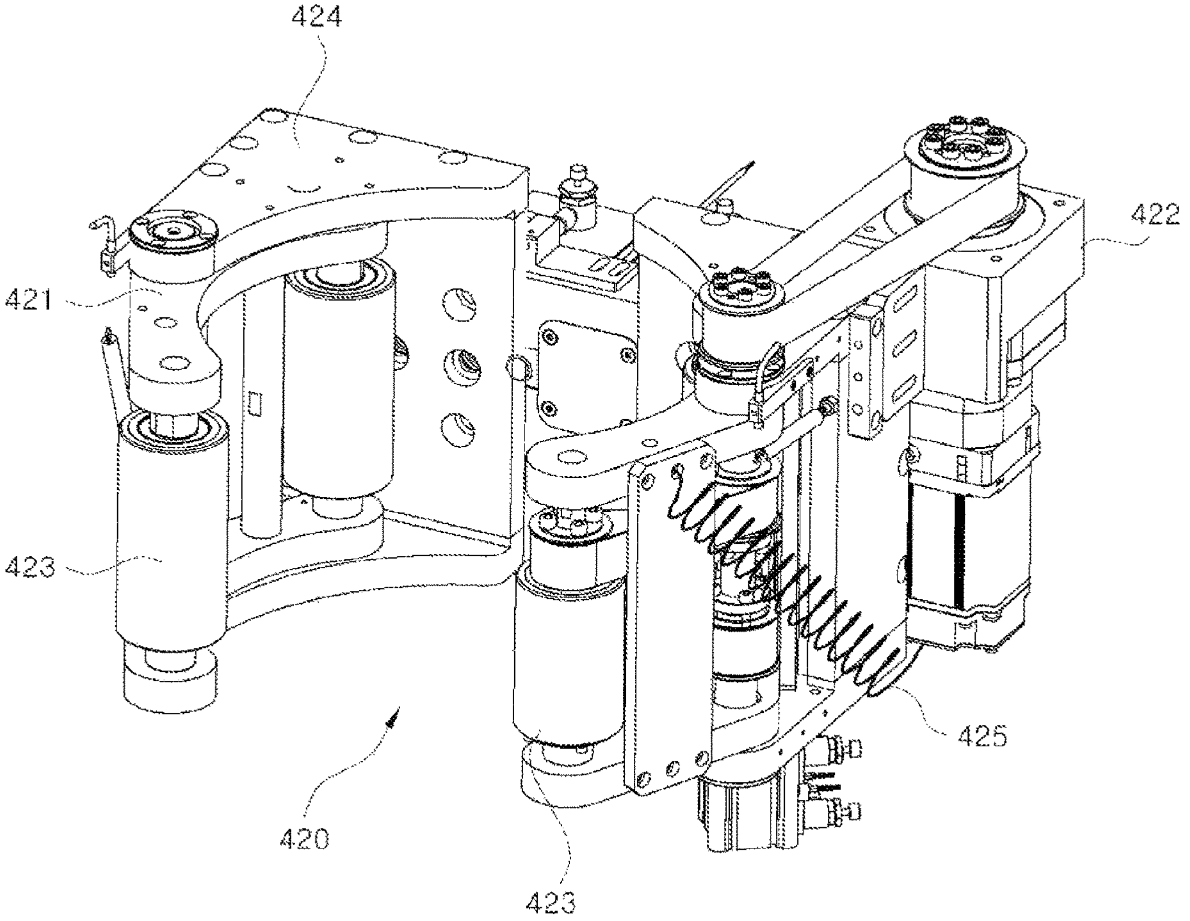
FIG. 5 is a perspective view showing the clamp of the present invention.

The clamp 420 is installed on the lift 400, as shown in FIG. 5, so that one pair of grippers 421 are opened or closed so as to clamp the high-pressure gas container 200 or release the clamping. Each of the grippers 421 is provided with a roller 423 that is rotated by an actuator that is a driving means 422, so that when the high-pressure gas container 200 is placed on the die 410 of the lift 400 and the gripper 421 is closed, in the state where the high-pressure gas container 200 is encompassed and clamped by the roller 423 rotatably installed in the gripper 421, the high-pressure gas container 200 is raised by the operation of the lift 400.

The process of aligning the high-pressure gas container 200 by the above-described configuration will be described in more detail as follows.

Figure 9:
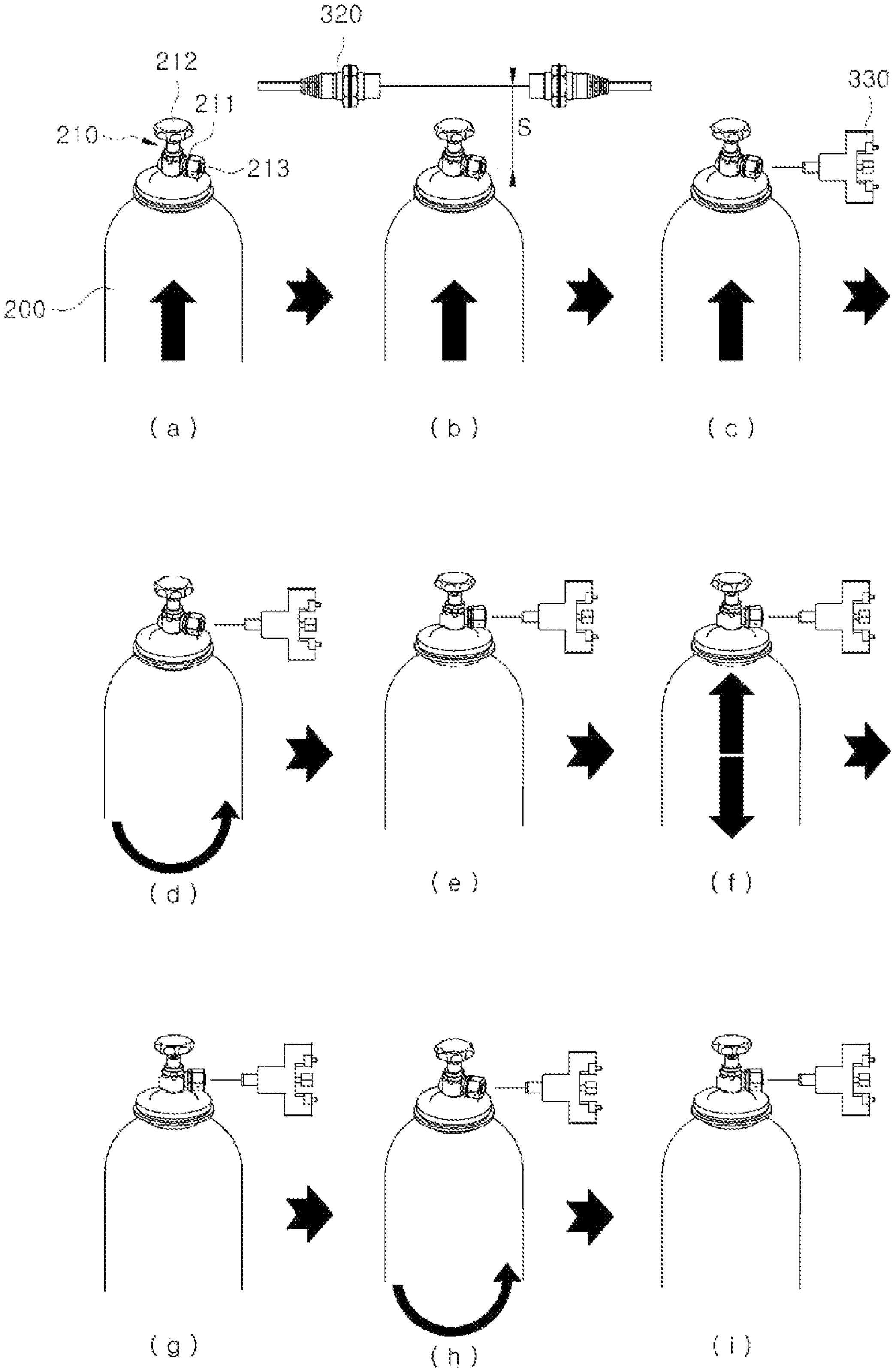
FIG. 9 is a flow diagram of a high-pressure gas container for explaining the present invention.
Figure 10:
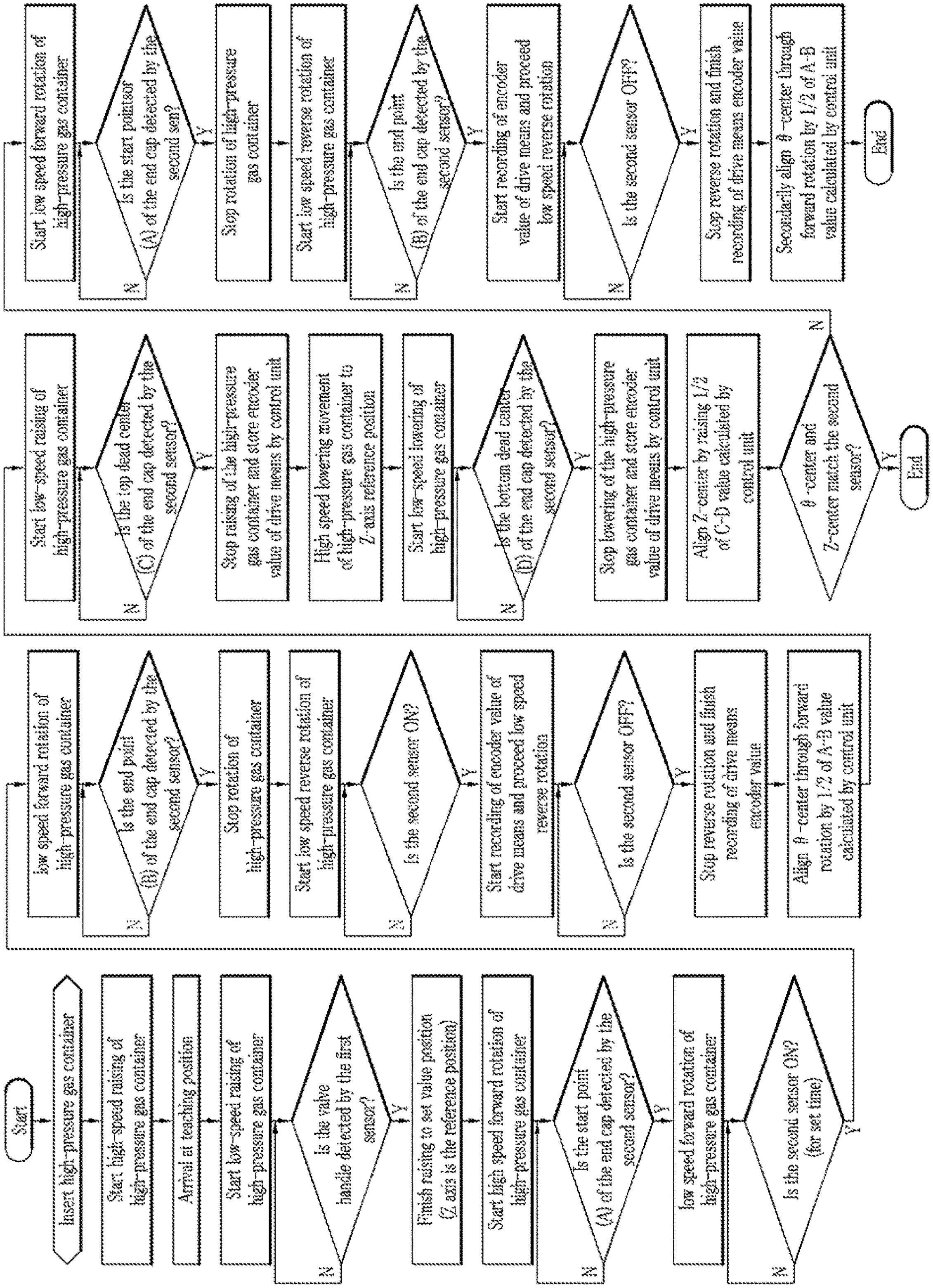
FIG. 10 is a flow chart for explaining the present invention.

FIG. 9 is a flow diagram of a high-pressure gas container for explaining the present invention, and FIG. 10 is a flow chart for explaining the present invention.

First, if the high-pressure gas container 200 is placed on the die 410 installed on the lower portion of the lift 400 in the state where the grippers 421 of the clamp 420 are mutually spaced apart from each other, since the one pair of grippers 421 that are open are simultaneously pushed by the high-pressure gas container 200 so as to be closed, the rollers 423 installed on the grippers 421 clamp the high-pressure gas container 200.

It is possible to maintain the one pair of grippers 421 to be apart from each other before the high-pressure gas container 200 is placed on the die 410 since coil springs 425 are connected between frames 424 and the grippers 421, which constitute the clamp 420.

Figure 6:
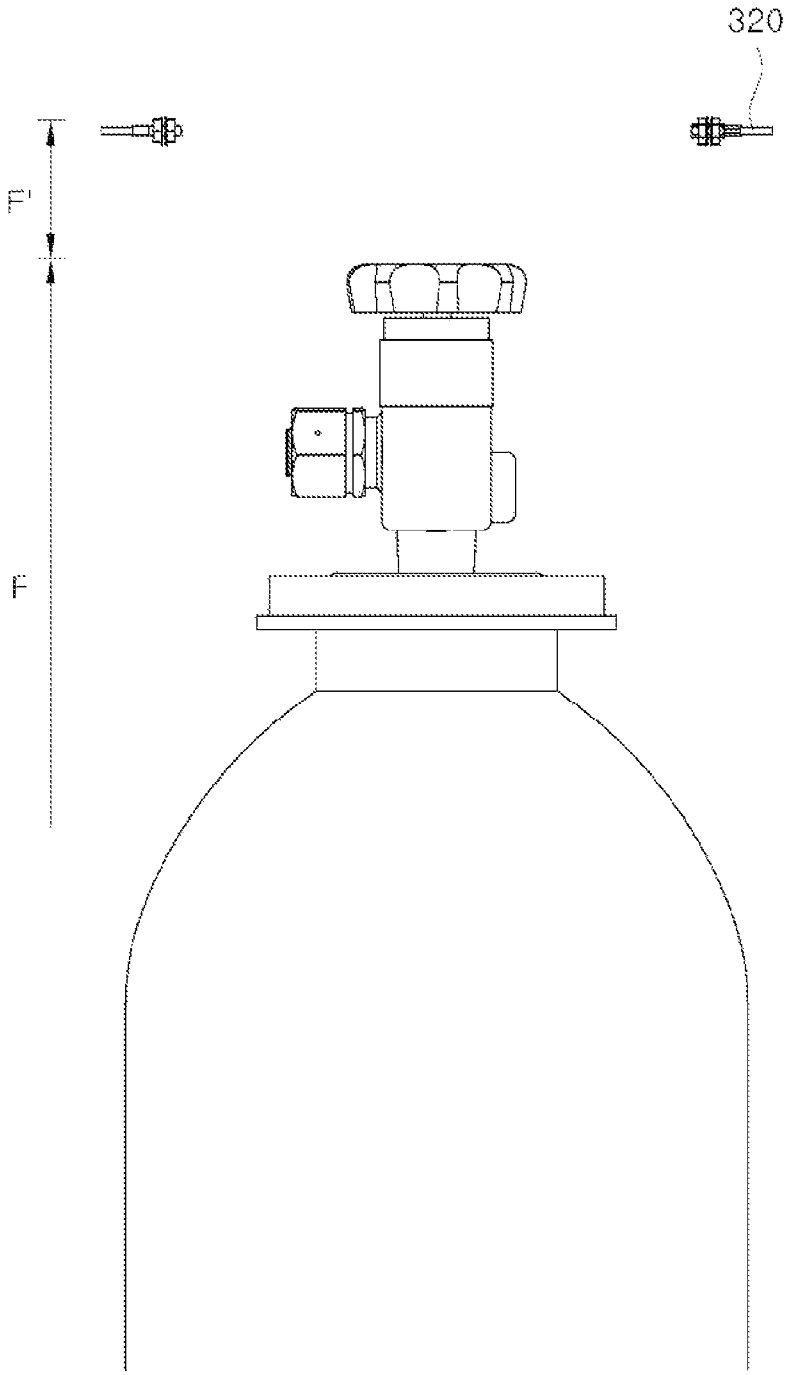
FIG. 6 is a schematic view showing a section in which the high-pressure gas container of the present invention is raised.
Figure 7:
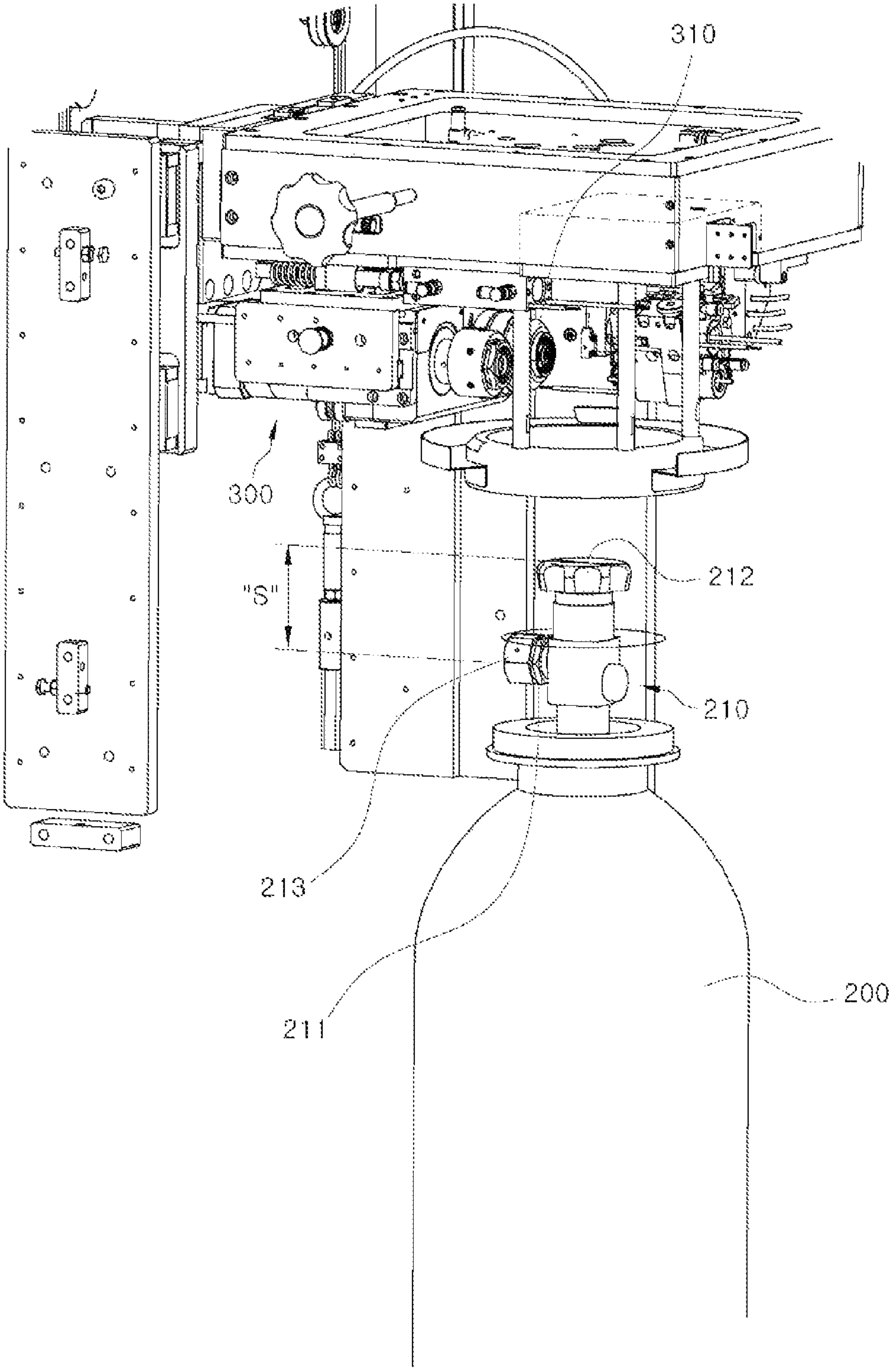
FIG. 7 is a perspective view showing the connecting unit and the high-pressure gas container of the present invention.
Figure 8:
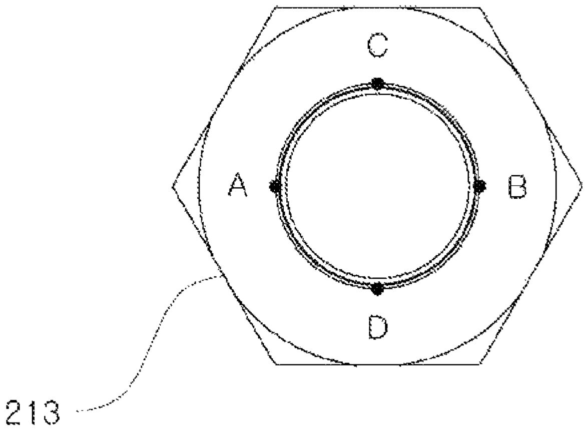
FIG. 8 is a schematic diagram for illustrating the process of finding the center θ and the center Z of an end cap in the present invention.

That is, the lift 400 is driven in a state as shown in FIG. 9(*a*) so that the high-pressure gas container 200 is raised until the first sensor 320 detects the upper end of the valve handle 212 installed on the upper portion of the high-pressure gas container 200, as shown in FIG. 9(*b*), wherein the lift 400 may be raised at the same speed but it is preferable in order to reduce the cycle time of expensive equipment that the lift 400 is raised at a high speed by a distance F set by the control unit 500 in the beginning of the lifting and then the lift 400 is raised at a low speed in a section F' in which the first sensor 320 carries out sensing, as shown in FIG. 6.

After raising the lift 400 as described above until the first sensor 320 detects the valve handle 212 of the high-pressure gas container 200, the lift 400 is re-driven by the control unit 500 so as to further raise the high-pressure gas container 200 by a value set in the control unit 500 (a distance S to the center of the end cap 213 from the upper end of the valve handle 212 and then the operation of the lift 400 is stopped, thereby finishing the raising of the high-pressure gas container 200.

Accordingly, the center Z of the end cap 213 that has been screw-coupled to the valve 210 and closed the gas injection nozzle 211 is determined.

After that, when the roller 423 at one side is rotated by the actautor, which is the drive means 422 of the clamp 420, so as to find the center θ of the end cap 213, the high-pressure gas container 200 placed on the die 410 rotates as shown in FIG. 9(*d*), wherein when the second sensor 330 senses the start point A of the end cap 213 by the rotation of the high-pressure gas container 200, it is notified to the control unit 500.

When the high-pressure gas container 200 is raised and then rotated for the first time so as to find the center θ of the end cap 213 as described above, it is more preferable to rotate the valve handle 212 in the opposite direction so as to be locked.

This is to prevent the valve handle 212 from being opened by centrifugal force when the high-pressure gas container 200 is rotated while the high-pressure gas container 200 is loaded on the lift 400.

In this state, when the high-pressure gas container 200 is continuously rotated so that the second sensor 330 senses the end point B of the end cap 213, it is notified to the control unit 500 and at the same time the rotation of the high-pressure gas container 200 is stopped. Then, the high-pressure gas container 200 is rotated in the opposite direction according to the center θ of the end cap 213, which is calculated by the control unit 500, so that the center θ of the end cap 213 is matched with the center of the second sensor 330, as shown in FIG. 9(*e*).

However, in order to find the center θ of the end cap 213 more precisely, it is more preferable to detect the distance from the point B to the point A by rotating the high-pressure gas container 200 in the counterclockwise direction.

This is to minimize the phenomenon that the center θ of the end cap 213 is shifted because of the generation of an error between the time when the second sensor 330 detects the start point A of the end cap 213 as the high-pressure gas container 200 starts rotating and the time when the control unit 500 recognizes it (so-called "hysteresis: differential").

After the center θ of the end cap 213 is matched with the center θ of the connector holder 310, the center Z of the end cap 213 must be matched with the center Z of the connector holder 310 in the above-mentioned manner.

when the lift 400 is raised and the second sensor 330 senses the top dead center C of the end cap 213, it is notified to the control unit 500 so that the raising of the lift 400 is stopped.

After that, when the lift 400 is lowered so that the second sensor 330 senses the bottom dead center D of the end cap 213, it is notified to the control unit 500 and at the same time the lowering of the lift 400 is stopped, as shown in FIG. 9(*f*). Then, the lift 400 is raised according to the center Z of the end cap 213, which is calculated by the control unit 500, so that the center Z of the end cap 213 is matched with the center of the second sensor 330, thereby finishing the alignment of the end cap 213 as shown in FIG. 9(*g*).

As described above, when the high-pressure gas container 200 is rotated by the drive means 422, the second sensor 330 detects the start point A, the end point B, the top dead center C, and the bottom dead center D of the end cap 213, and informs the control unit 500 of the points, wherein the center θ, which is the center of the start point A and the end point B, and the center Z, which is the center of the top dead center C and the bottom dead center D, may be recognized by the control unit 500 by calculating the encoder value obtained by driving the drive means 422.

Even though an embodiment of the present invention is explained that the high-pressure gas container 200 is raised to sense the top dead center C and then lowered to sense the bottom dead center D in order to find the center Z, it would be understood that the center Z may be matched with the second sensor 330 by lowering the high-pressure gas container 200 and then raising the high-pressure gas container 200 in the opposite manner.

When matching the center θ and the center Z of the end cap 213 with the center θ and the center Z of the connector holder 310 by the above method, if the centers are outside an error range set in the control unit 500 (for example, since the values of the center θ and the center Z are around 10 mm in the case where the width of the end cap is 20 mm, such an approximate value is inputted in advance to the control unit and when a calculated value is out of the approximate value), it is more preferable to perform by a set number of times the operations of generating an error and informing a worker of the error and then after the time set by the control unit 500, rotating the high-pressure gas container 200 simultaneously with raising or lowering the high-pressure gas container 200 so that the center θ and the center Z of the end cap 213 are re-detected.

If an error occurs continuously during the above operations, the operator must manually take measures so as to connect the gas injection nozzle 211 of the high-pressure gas container 200 to the connector holder 310.

However, the height of the upper end of the valve handle 212 to be coupled to the upper portion of the high-pressure gas container 200 may have a minute difference for each high-pressure gas container 200 depending on the processing error and assembly error of the valve 210 and thus the center θ of the end cap 213, which has been detected for the first time, may not be accurate. Therefore, as described above, after the center θ and the center Z of the end cap 213 are matched with the second sensor 330, the step of re-detecting the center θ of the end cap 213 is carried out once more as shown in FIG. 9(*h*) and FIG. 9(*i*), so that the center θ and the center Z of the end cap 213 may be matched with the center θ and the center Z of the connector holder 310. Then, after removing the end cap 213 from the valve 210 of the high-pressure gas container 200, it is possible to automatically connect the gas injection nozzle 211 to the connector holder 310 connected to the gas supply line.

While the present invention has been particularly shown and described with reference to the preferred embodiments thereof, it will be understood by those skilled in the art that various changes in form and details may be made therein without departing from the spirit and scope of the invention as defined by the appended claims.

Therefore, the above-described embodiments are to be considered in all respects as illustrative and not restrictive, and the scope of the invention as set forth in the foregoing detailed description is indicated by the following claims, and all such modifications or variations that come within the meaning and range of the claims and their equivalents are intended to be embraced therein.

What is claimed is:

1. An automatic alignment method of a high-pressure gas container, comprising in sequence the steps of:

loading a high-pressure gas container on a lift and raising the lift until a first sensor detects an upper end of a valve handle installed on the upper portion of the high-pressure gas container;

re-driving the lift so as to re-raise the high-pressure gas container by a value set in a control unit (distance to the center of an end cap from the upper end of the valve handle) and then stopping the operation of the lift;

rotating the high-pressure gas container and, when a second sensor senses a start point of the end cap, notifying the control unit;

continuously rotating the high-pressure gas container and, when the second sensor senses an end point of the end cap, notifying the control unit simultaneously with stopping the rotation of the high-pressure gas container, and rotating the high-pressure gas container in the opposite direction according to the θ-center of the end cap, which is calculated by the control unit, so as to align the θ-center of the end cap with the center of the second sensor;

raising the lift and, when the second sensor senses the top dead center of the end cap, notifying the control unit and stopping the raising of the lift; and lowering the lift and, when the second sensor senses the bottom dead center of the end cap, notifying the control unit simultaneously with stopping the lowering of the lift, and raising the lift according to the Z-center of the end cap, which is calculated by the control unit, so as to align the Z-center of the end cap with the center of the second sensor.

2. The automatic alignment method of a high-pressure gas container according to claim 1, wherein the lift on which the high-pressure gas container is placed is raised at a high speed by a distance set by the control unit and the lift is lifted at a low speed in a section in which the first sensor carries out sensing.

3. The automatic alignment method of a high-pressure gas container according to claim 1, wherein the high-pressure gas container is loaded on a die of the lift and raised by clamping by a clamp and, at the same time, the high-pressure gas container loaded on the die is rotated by the rotation of the roller by a drive means.

4. The automatic alignment method of a high-pressure gas container according to claim 1, wherein when the high-pressure gas container is raised and rotated for the first time in order to find the θ-center of the end cap, the valve handle is rotated in the opposite direction so as to be locked.

5. The automatic alignment method of a high-pressure gas container according to claim 1, wherein when finding the θ-center of the end cap, in a state where the end point of the end cap is sensed, the high-pressure gas container is rotated in the direction in which the handle is locked, so as to re-detect the start point of the end cap.

6. The automatic alignment method of a high-pressure gas container according to claim 1, wherein when finding the θ-center and the Z-center of the end cap, if the centers are out of an error range set in the control unit, an error occurs and is notified to a worker.

7. The automatic alignment method of a high-pressure gas container according to claim 6, wherein after a time set by the control unit since an error is generated and notified to a worker by the control unit, the operation of re-detecting the θ-center and the Z-center of the end cap by rotating and simultaneously raising or lowering the high-pressure gas container is further performed a predetermined number of times.

8. The automatic alignment method of a high-pressure gas container according to claim 2, wherein after raising or lowering the high-pressure gas container so as to match the Z-center of the end cap to the second sensor, the step of re-detecting the θ-center of the end cap is performed once more in consideration of processing errors and assembly errors of the valve.

* * * * *